Patented Dec. 12, 1922.

1,438,441

UNITED STATES PATENT OFFICE.

WILLIAM B. JOHNSON, OF ATLANTA, GEORGIA.

PROCESS OF MAKING BREAD.

No Drawing. Application filed July 15, 1921. Serial No. 485,064.

*To all whom it may concern:*

Be it known that I, WILLIAM B. JOHNSON, a citizen of the United States of America, and a resident of Atlanta, county of Fulton, and State of Georgia, have invented certain new and useful Improvements in Processes of Making Bread, of which the following is a full and clear specification.

The object of this invention is to produce a loaf of bread or other bread product, such as biscuit, cake, etc., which is highly rich in vitamines and other nutritious substances and which will also contain a much larger number of calories than ordinary bread, I having been able to double the number of calories in bread made in accordance with my process.

I first thoroughly steam-cook three parts of a suitable cereal, preferably a mixture containing one part whole rice and two parts of wheat bran, these being cooked together, enough water being added to make the cooked mass liquid or just sufficiently liquid to enable it to be poured. When this cooked mash cools down to about 80° F., I add a mixture of yeast culture and malt syrup, the syrup containing as usual about 65% of maltose (i. e., malt sugar), 3% amino proteins, 3% phosphate minerals, and 1½% of lactic acid. The mash is then stirred and is allowed to ferment for from 1½ to 2 hours. The gas formed by this fermentation readily escapes from the mash because of its liquid condition, thereby avoiding inflating or raising the mass. By this fermentation step in the process, the yeast culture introduced converts the materials in the batch into a large quantity of new yeast, this resulting from the action of the amino proteins, phosphate minerals and lactic acid on the yeast cells, causing them to grow and multiply very rapidly. In this way, the vitamine content is greatly increased.

After the mixture is fermented completely, it is then mixed with a suitable quantity —say 25%—of white dough containing the usual amount of salt, water, yeast and shortening and desirably about 20% of sweetened condensed milk, this milk being desirable because of its being rich in vitamines. The whole is then fermented again for two to three hours, after which it is ready to be molded into loaves and baked 50 minutes to 1¼ hours. When the loaves cool, they are desirably wrapped in waxed paraffin paper, preferably in an air-tight carton, which will keep the bread fresh for an indefinite period of time. This bread may be placed on the market in the form of loaves or it may be disintegrated into small particles like "grape-nuts" and subjected to another slow baking for two or more hours to dry it thoroughly before it is placed in air-tight cartons. The bread may also be made into flakes or crackers or any other suitable form.

It will be understood that a feature of importance of my process is the manner in which I make a vitamine-rich mash prior to mixing the same with the flour to make the dough. It is essential that this mash be in liquid form in order not only that the gas shall escape and thus prevent the mash "rising," but also in order that the gas shall escape promptly to thereby prevent the same exhausting the yeast cells and permitting the yeast cells to be kept in a fresh vigorous state by the yeast foods that are in the mash.

It will be understood that the proportions of the various ingredients may be greatly varied and that they depend upon the nature of the product that is desired. For instance, an effective mash may be made from 100 pounds of cereal flour (either whole-wheat flour or the rice-and-wheat-bran mixture heretofore set forth, or any other cereal product), 5 pounds of yeast and 3 pounds of yeast food (i. e., malt syrup), with sufficient water to enable the same to be cooked and fermented. After thorough fermentation, I estimate that this mash will contain the equivalent of 15 pounds of yeast culture and, therefore, the whole mass will teem with vitamines. In making a bread product with this mash, it will be understood that the proportions given above may be greatly varied; for instance, instead of the proportions named, I may use 100 pounds of white dough to every 25 pounds of the vitamine mash.

The nature and scope of the invention having been thus indicated and its preferred embodiment having been specifically described, what is claimed as new is:

1. The process herein described of making a bread product, consisting in first cooking in a liquid form a cereal product, allowing the same to partially cool, then mixing therewith while the same is warm and in liquid form a yeast culture and malt syrup; then permitting the mixture to ferment, the gas generated by this fermentation being permitted to escape readily by reason of the liquid condition of the mixture; then mixing the aforesaid fermented mixture with a quantity of flour and allowing this mixture to ferment; and then baking the dough product thus obtained.

2. The process herein described of making a bread product, consisting in first making a liquid mash from a cereal product, a yeast culture and malt syrup, sufficient water being added to bring this mash to a substantially liquid form; then permitting the mixture to ferment, the gas generated by fermentation being permitted to readily escape by reason of the liquid condition of the mixture; then mixing the mash thus formed with a suitable quantity of flour and allowing this dough to ferment; and then baking the dough thus obtained.

In testimony whereof I hereunto affix my signature.

WM. B. JOHNSON.